United States Patent
Tatei et al.

(10) Patent No.: US 9,631,953 B2
(45) Date of Patent: Apr. 25, 2017

(54) ROTATION NUMBER DETECTOR

(71) Applicants: Yoshinao Tatei, Tokyo (JP); Takeshi Musha, Tokyo (JP); Hajime Nakajima, Tokyo (JP); Takashi Okamuro, Tokyo (JP); Masanori Nimura, Tokyo (JP)

(72) Inventors: Yoshinao Tatei, Tokyo (JP); Takeshi Musha, Tokyo (JP); Hajime Nakajima, Tokyo (JP); Takashi Okamuro, Tokyo (JP); Masanori Nimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 11 days.

(21) Appl. No.: 14/655,837

(22) PCT Filed: Feb. 22, 2013

(86) PCT No.: PCT/JP2013/054603
§ 371 (c)(1),
(2) Date: Jun. 26, 2015

(87) PCT Pub. No.: WO2014/128937
PCT Pub. Date: Aug. 28, 2014

(65) Prior Publication Data
US 2015/0338245 A1    Nov. 26, 2015

(51) Int. Cl.
*G01B 7/14*    (2006.01)
*G01B 7/30*    (2006.01)
(Continued)

(52) U.S. Cl.
CPC ............ *G01D 5/244* (2013.01); *G01D 5/2006* (2013.01); *G01P 3/4815* (2013.01); *G01D 5/145* (2013.01)

(58) Field of Classification Search
CPC    G01D 5/12; G01D 5/14; G01D 5/244; G01D 5/2006; G01P 3/487; G01P 3/4815
(Continued)

(56) References Cited

U.S. PATENT DOCUMENTS 6,735,269 B2    5/2004 Siess et al.
8,655,615 B2    2/2014 Mehnert et al.
(Continued)

FOREIGN PATENT DOCUMENTS

DE    31 18 768 A1    4/1982
DE    3619500 A1    12/1987
(Continued)

OTHER PUBLICATIONS

Taiwanese Office Action for TW 102128227 dated Sep. 18, 2014.
(Continued)

*Primary Examiner* — Reena Aurora
(74) *Attorney, Agent, or Firm* — Sughrue Mion, PLLC; Richard C. Turner (57) ABSTRACT

A rotation number detector according to an embodiment is a rotation number detector that detects the number of rotations of a magnet attached to a rotating body by using a power generation unit. The power generation unit includes N (N is a natural number equal to or larger than 1) power generation elements, each including a magnetic wire in which magnetization reversal occurs due to a large Barkhausen effect and a pickup coil that is wound around the magnetic wire. The magnetic wire is longer than a wound portion of the pickup coil in an extension direction of the magnetic wire of the power generation elements. The magnetic wire is set above a rotation center of the magnet.

7 Claims, 7 Drawing Sheets

(51) Int. Cl.
*G01D 5/244* (2006.01)
*G01D 5/20* (2006.01)
*G01P 3/481* (2006.01)
*G01D 5/14* (2006.01)

(58) Field of Classification Search
USPC ........................................ 324/207.17, 207.15
See application file for complete search history.

(56) References Cited

U.S. PATENT DOCUMENTS

| | | | |
|---|---|---|---|
| 9,052,185 B2 * | 6/2015 | Oyama | ................... G01P 3/487 |
| 9,200,925 B2 | 12/2015 | Mehnert et al. | |
| 2010/0213927 A1 * | 8/2010 | Mehnert | ............... G01P 3/4815 324/207.2 |
| 2011/0184691 A1 | 7/2011 | Mehnert et al. | |
| 2014/0067301 A1 | 3/2014 | Mehnert et al. | |

FOREIGN PATENT DOCUMENTS

| | | |
|---|---|---|
| DE | 102007039051 A1 | 2/2009 |
| EP | 0484716 A1 | 10/1991 |
| JP | 58-161669 A | 9/1983 |
| JP | 59-52729 U | 4/1984 |
| JP | 63-117504 U | 7/1988 |
| JP | 4-122378 U | 11/1992 |
| JP | 2002-286742 A | 10/2002 |
| JP | 2008-14799 A | 1/2008 |
| JP | 2012-198067 A | 10/2012 |

OTHER PUBLICATIONS

International Search Report for PCT/JP2013/054603 dated Apr. 2, 2013.
Communication dated Dec. 1, 2015 from the Japanese Patent Office issued in corresponding Application No. 2015-501200.
German Office Action corresponding to German Patent Application No. 11 2013 006 367.0, dated Jul. 4, 2016.

* cited by examiner

ROTATION NUMBER DETECTOR

CROSS REFERENCE TO RELATED APPLICATIONS

This application is a National Stage of International Application No. PCT/JP2013/054603 filed Feb. 22, 2013, the contents of which are incorporated herein by reference in their entirety.

FIELD

The present invention relates to a rotation number detector that uses a magnetic wire in order to count the number of rotations of a rotating body used in various fields, such as industrial factory automation (FA) devices and in vehicles.

BACKGROUND

For commercially available rotation number detectors, there are conventional techniques described in Patent Literature 1 and Patent Literature 2 of such detectors that use self power-generation provided by a magnetic wire and a pickup coil. In Patent Literature 1, by using a power generating device that combines a magnet magnetized with one north pole and one south pole with a pickup coil and a magnetic wire that exhibits a large Barkhausen Effect, a back-up electric power source for the detector is supplied by the electrical power from the power generating device. The generator elements are 90 degrees out of phase for each revolution and two power generating devices are provided In Patent Literature 2, a plurality of combinations of a magnetic wire and a coil are arranged radially, and changes in the inductance thereof are converted into electric signals.

The large Barkhausen effect is a phenomenon in which magnetizations are abruptly reversed concurrently in a magnet wire near a boundary of the S/N poles of a magnet. By detecting the magnetization reversal with a pickup coil, constant power generation pulses can be acquired regardless of the rotation speed of the object whose rotations are being detected, such as a motor.

CITATION LIST

Patent Literatures

Patent Literature 1: Japanese Patent Application Laid-open No. 2008-14799

Patent Literature 2: Japanese Utility Model Laid-open Publication No. S63-117504

SUMMARY

Technical Problem

When a magnet magnetized with one S pole and one N pole and a power generation element are combined, the largest amount of power can be generated when the power generation element is set in the center of the magnet, i.e., at the center of rotation. Depending on the manufacturing process of the magnetic wire, when the power generation element is set near an outer periphery of the magnet, only about 40 percent of the amount of power can be generated compared with when the power generation element is arranged at the center of rotation of the magnet. That is, when the power generation elements are provided such that they avoid the center of the magnet, as illustrated in the drawings of Patent Literature 1, the power generation amount from each of the power generation elements decreases when compared to a configuration where one power generation element is set just above the center of the magnet. This means that locating the elements away from the center decrease the reliability of the detector.

If the center of the magnet and the center of rotation are out of alignment, the magnet eccentrically rotates. That is, as viewed from the power generation element, the position of the power generation element with respect to the magnet (the amount of displacement from the center of the magnet) changes in common with the rotation angle of the magnet. When the power generation element is set near the center of the magnet, a change the amount of the power generated is small with respect to a change in the position of the power generation element with respect to the magnet. Conversely, when the power generation element is set so as to avoid the center of the magnet, the change in the amount of power generated is large with respect to a change in the position of the power generation element with respect to the magnet; and the amount of power generated varies considerably, thus causing the reliability of the detector to decrease.

If it is configured that two power generation devices are set with a phase difference of 90 degrees per one rotation, as illustrated in Patent Literature 1, in order to determine the rotation direction and if the power generation elements are set above the center of rotation of the magnet in order to solve the above problems, the two power generation elements must be stacked one on top of the other. In this case, there are two problems, which are as described below. The first problem is that when the outer diameter of the coils of the power generation elements is, for example, about 5 millimeters and the two power generation elements are stacked, the thickness thereof becomes 10 millimeters and the detector becomes thicker by this thickness. The second problem is that when the distance between the magnet and a lower power generation element (a lower magnetic wire) is set to be G millimeters, the distance from the magnet to an upper power generation element becomes G+5 millimeters. Thus, the distances from the magnet are different for the two power generation elements, and there is a concern that the detection reliability might be decreased due to a difference in the output pulses.

The present invention has been achieved in view of the above problems, and an objective of the present invention is to provide a thin and highly-reliable rotation number detector that can acquire more stable power generation pulses.

Solution to Problem

In order to solve the problem above and achieve the objective, the present invention relates to a rotation number detector that detects a number of rotations of a magnet attached to a rotating body by using a power generation unit. The power generation unit includes N (N is a natural number equal to or larger than 1) power generation elements, each including a magnetic wire, in which magnetization reversal occurs due to a large Barkhausen effect, and a pickup coil that is wound around the magnetic wire. The magnetic wire is longer than a wound portion of the pickup coil in an extension direction of the magnetic wire of the power generation elements. The magnetic wire is provided above a rotation center of the magnet.

Advantageous Effects of Invention

The rotation number detector according to the present invention has high design flexibility and can achieve both thinning and improvement in power generation reliability.

BRIEF DESCRIPTION OF DRAWINGS

FIG. 5-1 is a diagram illustrating an example of a power generation pulse in a conventional rotation number detector.

FIG. 5-2 is a diagram illustrating an example of a power generation pulse in the rotation number detector according to the first embodiment.

DESCRIPTION OF EMBODIMENTS

Exemplary embodiments of a rotation number detector according to the present invention will be described below in detail with reference to the accompanying drawings. The present invention is not limited to the embodiments.

First Embodiment

Figure 1:
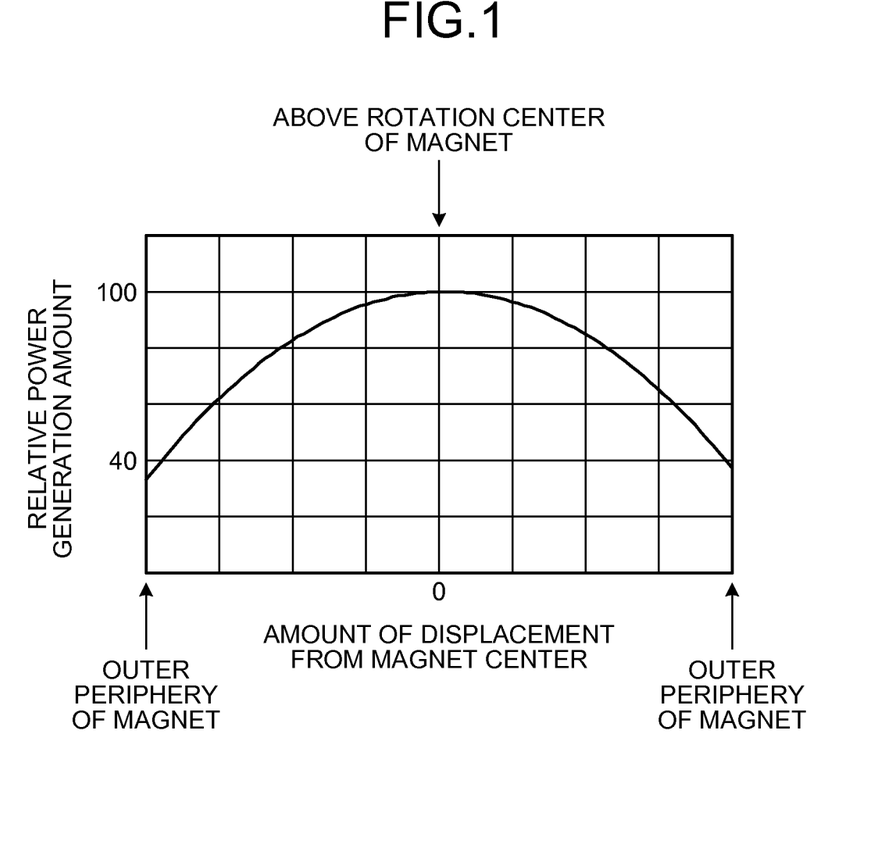
FIG. 1 is a diagram illustrating a graph showing the relation between the position of a rotation number detector with respect to a magnet and the amount of power generated.

A relation is illustrated in FIG. 1 between the position of a power generation element and the amount of power generated for a situation in which a magnet, magnetized with one S pole and one N pole, and a power generation element are combined. Here, the position of the power generation element with respect to the magnet (the amount of displacement from the center of the magnet) is plotted on the horizontal axis, and the amount of power generated by the power generation element is plotted on the vertical axis. As illustrated in FIG. 1, the amount of power generated by the power generation element is largest when the power generation element is set in the center of the magnet, i.e., at the center of rotation. Depending on the wire manufacturing method, when the power generation element is set near the outer periphery of the magnet, only about 40 percent of the amount of power can be generated compared with a case where the power generation element is set at the center of rotation of the magnet.

If the center of the magnet and the center of rotation are out of alignment, the magnet eccentrically rotates. That is, as viewed from the power generation element, the value along the horizontal axis (the amount of displacement from the center of the magnet) in FIG. 1 changes as the rotation angle of the magnet changes. When the power generation element is set near the center of the magnet, the change in the amount of power generated is small with respect to the change on the horizontal axis in FIG. 1. That is, the absolute value of inclination of the curved line in FIG. 1 is small. Conversely, when the power generation element is set so as to avoid the center of the magnet, the change in the amount of power generated (the absolute value of inclination along the curved line) with respect to the change along the horizontal axis is large, and the variation in the amount of power generated is large, so the reliability of the detector is decreased.

A configuration of a rotation number detector according to a first embodiment of the present invention is described below with reference to FIGS. 2 to 6.

Figure 2:
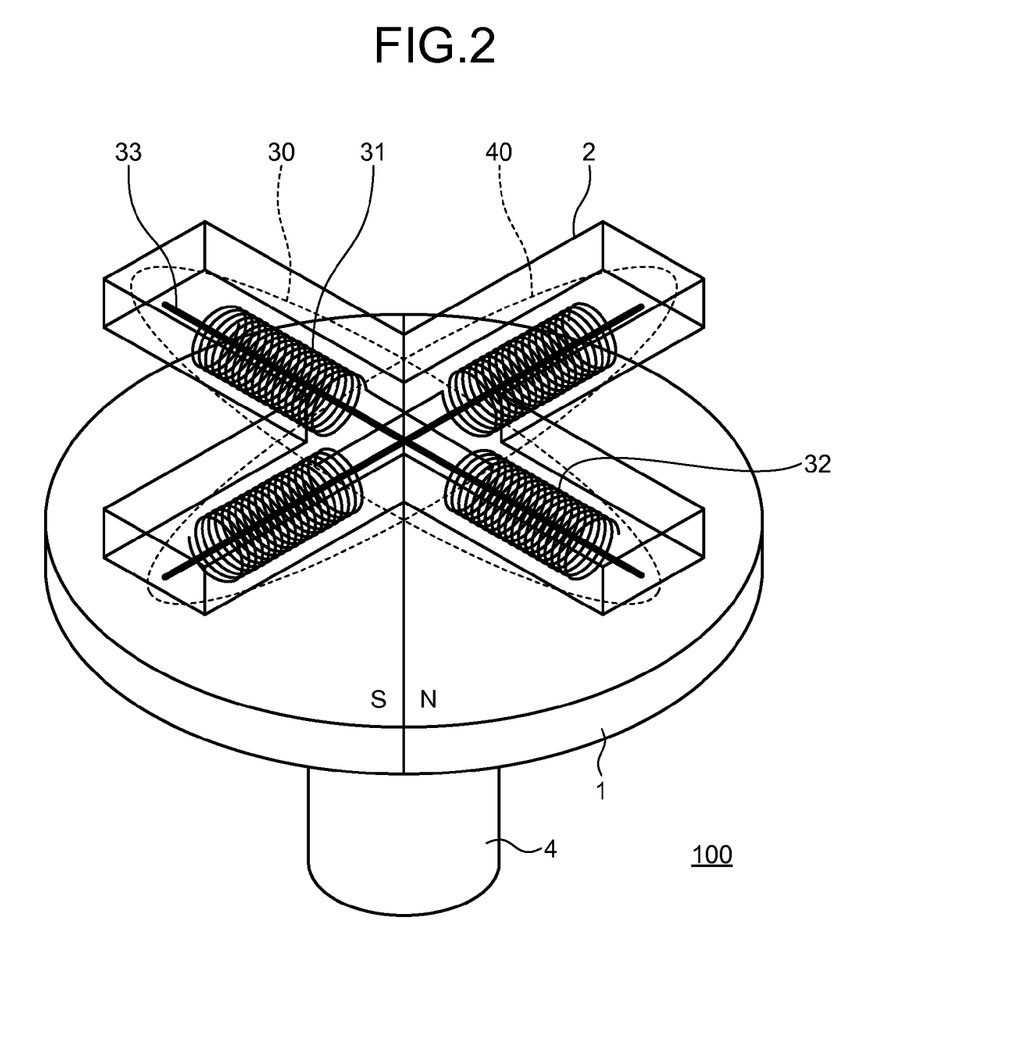
FIG. 2 is a perspective view illustrating a schematic configuration of a rotation number detector according to a first embodiment of the present invention.

FIG. 2 is a perspective view illustrating a schematic configuration of a rotation number detector 100 according to the first embodiment. The rotation number detector 100 according to the present embodiment includes a rotation shaft 4, a magnet 1 attached to the rotation shaft 4 to rotate integrally therewith, a power generation unit 2 that generates a power generation pulse with the rotation of the magnet 1, and a processing unit (not illustrated) that performs a counting process by using the power generation pulse from the power generation unit 2.

Figure 3:
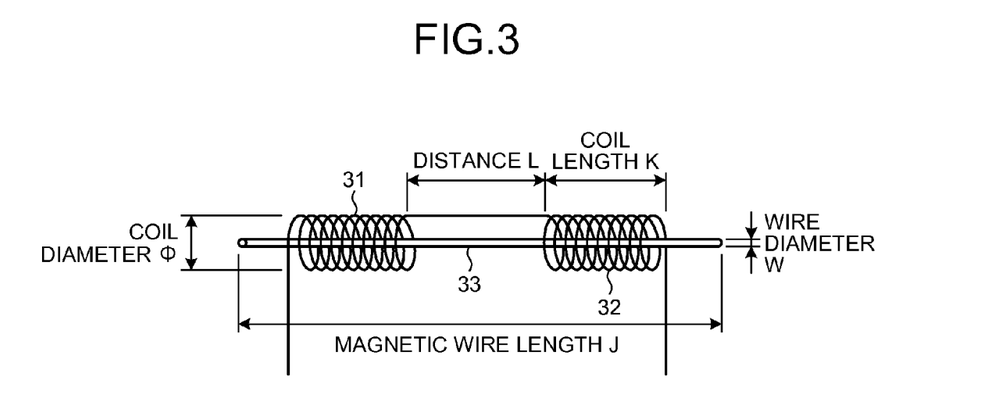
FIG. 3 is a diagram illustrating a detailed configuration of a power generation element of the rotation number detector according to the first embodiment.

The magnet 1 is a radially magnetized magnet magnetized with one S pole and one N pole in the radial direction; and the magnet 1 is attached to the rotation shaft 4 so that the center of rotation of the rotation shaft 4 and the center of the magnet are substantially aligned with each other. The power generation unit 2 is a single package of power generation elements 30 and 40, and it is set at a position away from the magnet 1 with a gap G in the direction of the axis of rotation. The power generation elements 30 and 40 are placed orthogonally to each other having a phase difference of 90 degrees with respect to one rotation of the magnet 1. As illustrated in FIG. 3, the power generation element 30 includes two pickup coils 31 and 32; and a magnetic wire 33 has the pickup coils 31 and 32 wound therearound. That is, the pickup coil of the power generation element 30 has two wound portions away from each other by a predetermined distance and connected in series to each other. The power generation element 40 has an identical configuration to that of the power generation element 30.

The pickup coils 31 and 32 that are two wound portions are placed with a distance L therebetween as illustrated in FIG. 3 and connected in series to each other. Accordingly, a magnetic wire of length J of the magnetic wire 33 in an extension direction is larger than the sum of lengths of the pickup coils 31 and 32. A left end of the pickup coil 31 and a right end of the pickup coil 32 are connected to the processing unit. The distance L has a relation of L>φ, where φ is the outer diameter of the coil. As illustrated in FIG. 2, the two power generation elements 30 and 40 are placed in such a manner that only magnetic wire portions overlap with each other above the center of rotation of the magnet 1 so as to prevent the coils from interfering with each other.

When the two power generation elements 30 and 40 overlap with each other together with the coils, the thickness of the power generation unit 2 becomes 2φ. However, when only the magnetic wire portions overlap with each other, the thickness of the power generation unit 2 is $\phi+2W+\alpha$ (W: a wire diameter of the magnetic wire, $\alpha$: a gap between the two magnetic wires). In the power generation elements 30 and 40, for example, $\alpha=5$ millimeters and W=about 0.2 millimeters and thus, when it is assumed that $\alpha=0.1$ millimeters, then $\phi+2W+\alpha=5.5$ millimeters, which when compared with $2\phi=10$ millimeters means considerable thinning of the rotation number detector 100. When it is assumed that the power generation element 30 is set on a lower side and that the power generation element 40 is set on an upper side, the distance between the magnet 1 and the power generation element 40 is G+W+$\alpha$. Here, G is between the magnet 1 and the power generation element 30. For example, when it is assumed that the gap G between the magnet 1 and the power generation element 30 is 3 millimeters, the gap between the magnet 1 and the power generation element 40 is G+W+$\alpha=3.3$ millimeters, and thus the respective gaps between the magnet 1 and the two power generation elements 30 and 40 can be set to values for them to be close to each other. If the two power generation elements 30 and 40 overlap with each other together with the coils, the gap between the magnet 1 and the power generation element 40 becomes G+$\phi=8$ millimeters, and the difference of the respective gaps between the magnet 1 and the two power generation elements 30 and 40 becomes large.

Operations of the rotation number detector 100 according to the present embodiment are described next. In each of the power generation elements 30 and 40, a positive pulse is generated near a boundary where the N pole is followed the S pole and a negative pulse is generated near a boundary where the S pole is followed the N pole with respect to one rotation of the magnet 1. At this time, when the rotation number detector 100 includes only one power generation element, the same positive pulse is generated both when the magnet 1 rotates in a clockwise (normal rotation) and becomes the N pole followed by the S pole and when the magnet 1 rotates in a counterclockwise (reverse rotation) and becomes the S pole followed by the N pole. Therefore, the rotation direction cannot be determined. In contrast thereto, when the power generation elements are placed in two, the forward direction and the reverse direction can be determined according to which of the positive pulse and the negative pulse is generated by the power generation element 40 after the power generation element 30 generates a positive pulse.

Figure 4:
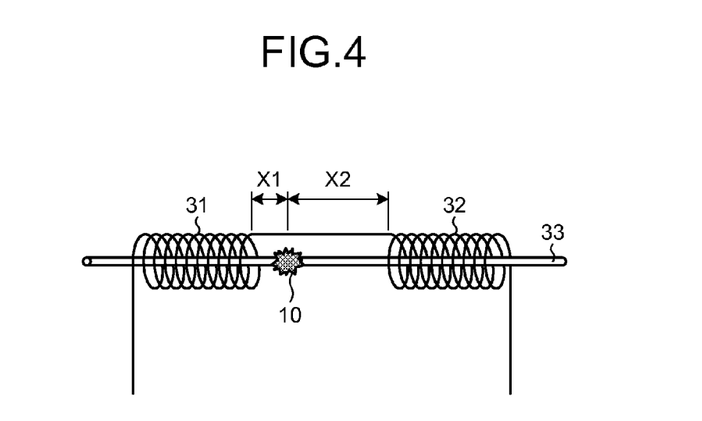
FIG. 4 is a diagram describing a magnetic-reversal generating point of the rotation number detector according to the first embodiment.
Figure 51:
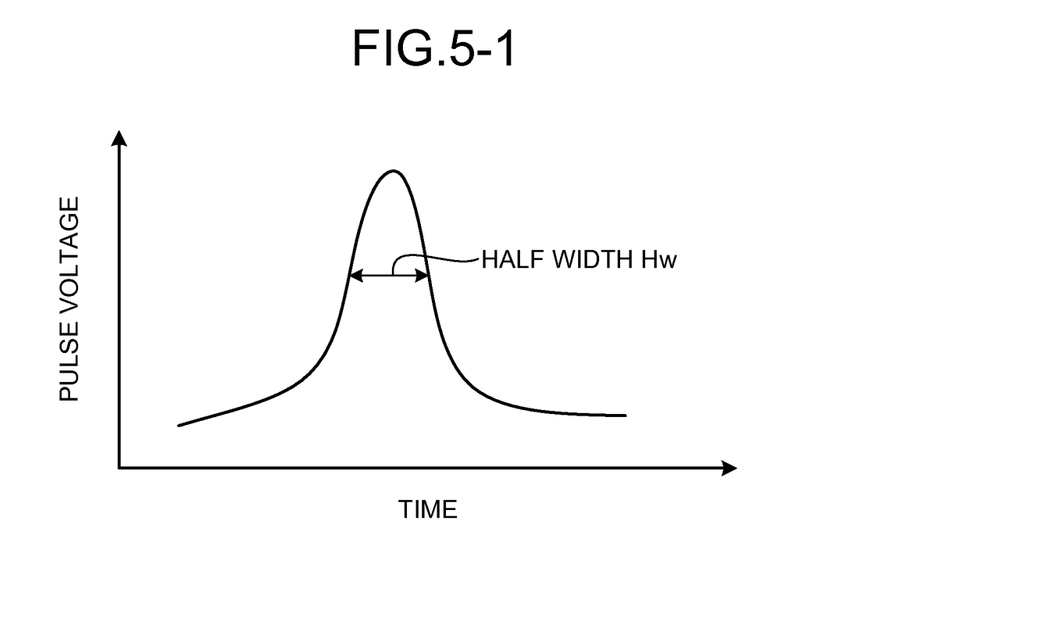
Figure 52:
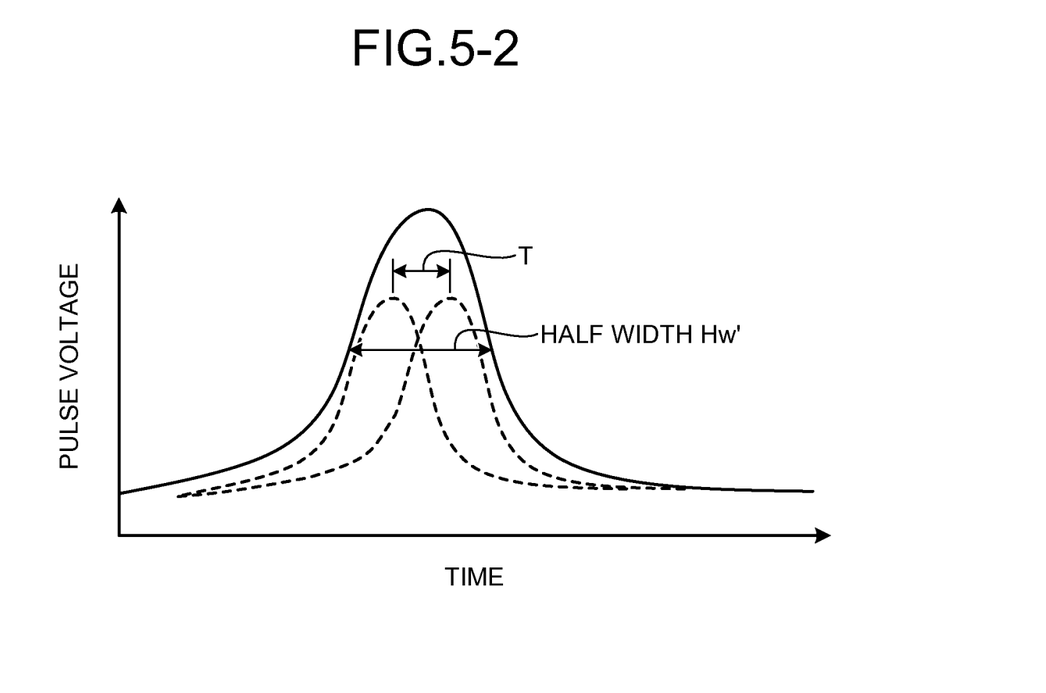

Detailed operations of the power generation elements 30 and 40 according to the present embodiment are described next with reference to FIGS. 4, 5-1, and 5-2. In the power generation element 30, the pickup coil detects changes in the magnetic field when magnetization reversals of the magnetic wire 33 occur concurrently due to the large Barkhausen effect. As illustrated in FIG. 4, the magnetization reversal occurs from a magnetic-reversal generating point 10 being a certain point of the magnetic wire 33 and spreads over the entire magnetic wire 33. The magnetic-reversal generating point 10 differs depending on the wire. When it is assumed that the distances between the magnetic-reversal generating point 10 and the pickup coils 31 and 32 are X1 and X2 (=L−X1), respectively, and the velocity of magnetization reversal is V, then a time lag T of (X2/V−X1/V) is generated in the power generation pulses generated by the pickup coils 31 and 32.

FIG. 5-1 illustrates an example of a power generation pulse (a half width Hw) acquired from a power generation element having a conventional combination of one magnetic wire and one pickup coil (the number of turns: N). The half width Hw depends on the coil length of the pickup coil in a state where the one pickup coil covers the magnetic wire and is, for example, 50 microseconds. In contrast thereto, in the present embodiment, the time lag (a difference between times at which magnetization reversal is detected) T from the two pickup coils 31 and 32 (the sum of the number of turns: N) is generated. Accordingly, an output from opposite ends of the pickup coils connected in series to each other has a waveform obtained by superimposing two pulse waveforms shifted by the time lag T on each other, as illustrated in FIG. 5-2. That is, Hw'=Hw+T. Therefore, a desired pulse half width Hw' can be acquired by changing the coil distance L. The half width Hw' takes a value such as 100 microseconds.

When the rotation speed is calculated by the processing unit, if the half width Hw of the power generation pulse is a small fixed value, the calculation time is limited because of the process period defined by the half width Hw; and there may be a restriction in circuit elements to be used, leading to an increase in cost. However, according to the present embodiment, a desired half width Hw' larger than the conventional half width Hw of the power generation pulse can be acquired by controlling and setting the time lag T, which is described below. A time width during which the processing mentioned above can be performed is extended by increasing the half width of the power generation pulse. Accordingly, circuit processing can be performed with a higher flexibility, and cost reduction can be realized.

The position of the magnetic-reversal generating point 10 differs according to magnetic wires; and the magnetization reversal velocity V can be measured beforehand by using an inspection device provided with the pickup coil. A pulse having the desired half width Hw' can be acquired by setting the coil distance L on the basis of the measured position of the magnetic-reversal generating point 10 and the measured value of the magnetization reversal velocity V. That is, when the position of the magnetic-reversal generating point 10, which differs depending on the magnetic wire, and the magnetization reversal velocity V are known, then, desired T=(X2/V−X1/V) is set changing the coil distance L. Accordingly, even if the conventional half width Hw (when the number of the wound portions of the pickup coil is only one) is unknown, the half width Hw' can be set to a value equal to or larger than a desired value according to the relation of Hw'=Hw+T. When the half width Hw is known, the half width Hw' can be set to a desired value. Therefore, because an arbitrary power generation pulse width can be acquired by adjusting the coil distance L, the design flexibility of the processing circuit is improved.

Figure 6:
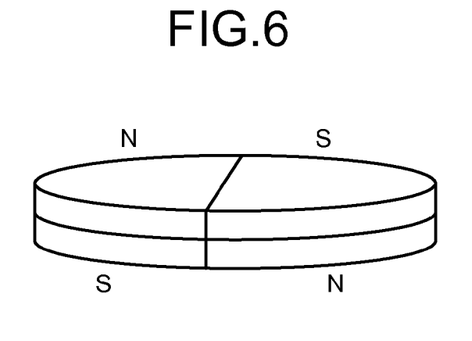
FIG. 6 is a diagram illustrating an example of another magnet used in the rotation number detector according to the first embodiment.

Magnetization of the magnet 1 according to the present embodiment has been described above by using an example of radial magnetization in which one S pole and one N pole are magnetized. However, the magnet 1 according to the present embodiment is not limited thereto, and it can be a double-sided four-pole magnet, for example, as illustrated in FIG. 6. This can be seen in the following embodiments.

Second Embodiment

A configuration of a rotation number detector 200 according to a second embodiment of the present invention is described below with reference to FIG. 7.

Figure 7:
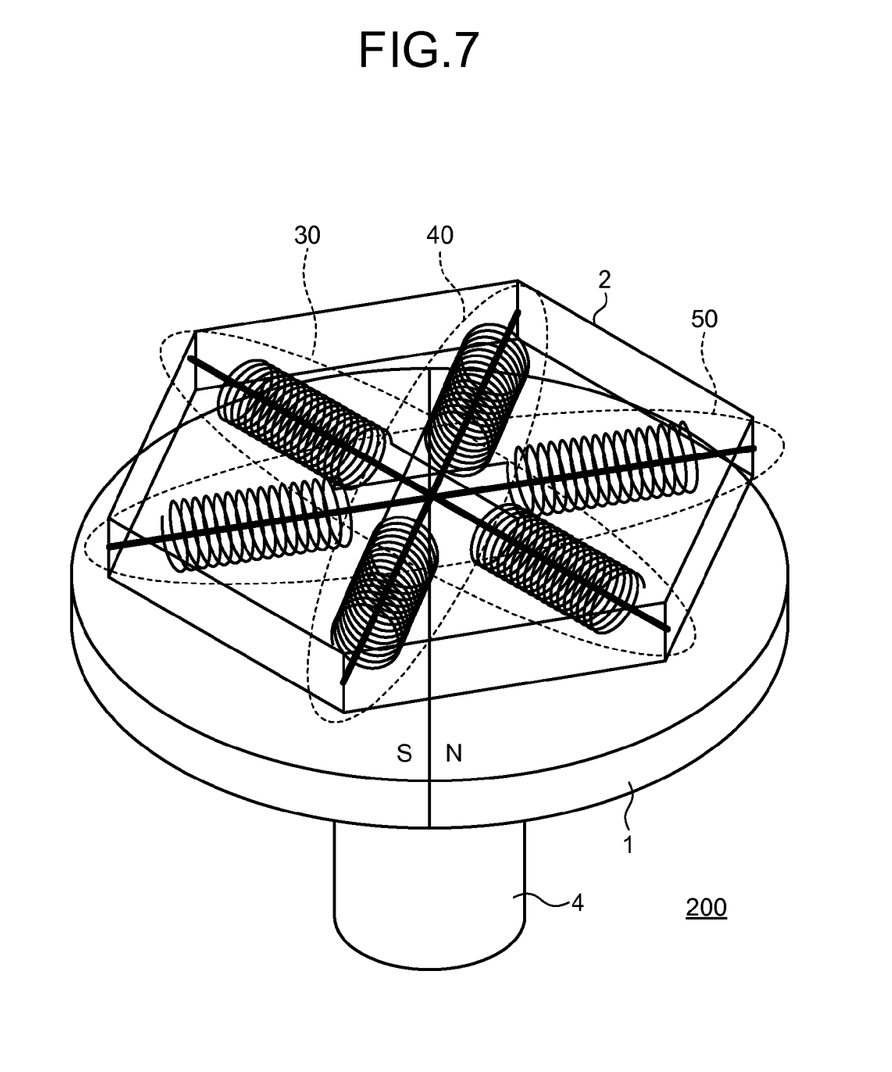
FIG. 7 is a perspective view illustrating a schematic configuration of a rotation number detector according to a second embodiment of the present invention.

FIG. 7 is a perspective view illustrating a schematic configuration of the rotation number detector 200 according to the second embodiment. While the configuration of the rotation number detector 200 is basically identical to that of the rotation number detector 100 according to the first embodiment, the detailed configuration of the power generation unit 2 is different therefrom. The power generation unit 2 is formed as a single package of the power generation elements 30, 40, and 50 and is set at a position away from the magnet 1 by the gap G in the direction of the axis of rotation. The power generation elements 30, 40, and 50 are placed with an equal distance therebetween and thus have a phase difference of 120 degrees with respect to one rotation of the magnet 1. As illustrated in FIG. 3, the power generation element 30 is constituted by the two pickup coils 31 and 32 and the magnetic wire 33. The power generation elements 40 and 50 have an identical configuration to that of the power generation element 30.

The pickup coils 31 and 32 are placed with the distance L therebetween and connected in series to each other as in the first embodiment. The left end of the pickup coil 31 and the right end of the pickup coil 32 are connected to the processing unit. The distance L has the relation of $L>\phi$ with respect to the outer diameter $\phi$ of the coil and, as illustrated in FIG. 7, the three power generation elements 30, 40, and 50 are placed in such a manner that only the magnetic wire portions overlap with one another above the center of the magnet 1 to prevent interference from the coils.

When the three power generation elements 30, 40, and 50 overlap with one another together with the coils, the thickness of the power generation unit 2 becomes $3\phi$. However, when only the magnetic wire portions overlap with one another, the thickness of the power generation unit 2 is $\phi+3W+2\alpha$ (W: the wire diameter of the magnetic wire, $\alpha$: the gap between the adjacent magnetic wires). In general power generation elements, for example, $\alpha=5$ millimeters and W is about 0.2 millimeters and thus, when it is assumed that $\alpha=0.1$ millimeter, the total becomes $\phi+3W+2\alpha=5.8$ millimeters, which is compared to $3\phi=15$ millimeters. Thus, greater thinning of the rotation number detector is achieved than in the first embodiment. When it is assumed that the power generation element 30 is set on the lowermost level and that the power generation element 50 is set on the uppermost level, the gap between the magnet 1 and the power generation element 50 is given by $G+2W+2\alpha$ for the gap G between the magnet 1 and the power generation element 30. For example, when it is assumed that the gap G between the magnet 1 and the power generation element 30 is 3 millimeters, the gap between the magnet 1 and the power generation element 50 is given by $G+2W+2\alpha=3.6$ millimeters, and thus the respective gaps between the magnet 1 and the three power generation elements 30, 40, and 50 can be set to close values. If the three power generation elements 30, 40, and 50 overlap with one another together with the coils, the gap between the magnet 1 and the power generation element 50 becomes $G+2\phi=13$ millimeters, and differences in the respective gaps between the magnet and the three power generation elements become large.

An operation of the rotation number detector 200 in which the three power generation elements are placed is described next. In each of the power generation elements 30, 40, and 50, a positive pulse is generated near the boundary where the N pole becomes the S pole and a negative pulse is generated near the boundary where the S pole becomes the N pole with respect to one rotation of the magnet 1.

In the rotation number detector 100 according to the first embodiment, when the pulse is normally generated, the number of rotations and the rotation direction can be determined without any problem. However, if the pulse is once lost due to a disturbance such as magnetic noise, distinction of the rotation direction cannot be performed, and erroneous counting of the number of rotations occurs. In the rotation number detector 200 according to the present embodiment, the three power generation elements are placed and thus, for example, even if the positive pulse of the power generation element 30 is lost, normal rotation can be determined when the positive pulse is generated in the power generation element 40; and reverse rotation can be determined when the positive pulse is generated in the power generation element 50. Therefore, corrections can be made for one missing pulse.

Similarly, by providing N power generation elements, corrections can be made for N−2 missing pulses. When it is desired to provide more power generation elements to correct for missing pulses in this manner, the number of power generation elements can be increased in the rotation number detector in which the power generation elements overlap with each other by the method according to the present embodiment and generally without changing the thickness of the detector.

Third Embodiment

A configuration of a rotation number detector 300 according to a third embodiment of the present invention is described below with reference to FIG. 8.

Figure 8:
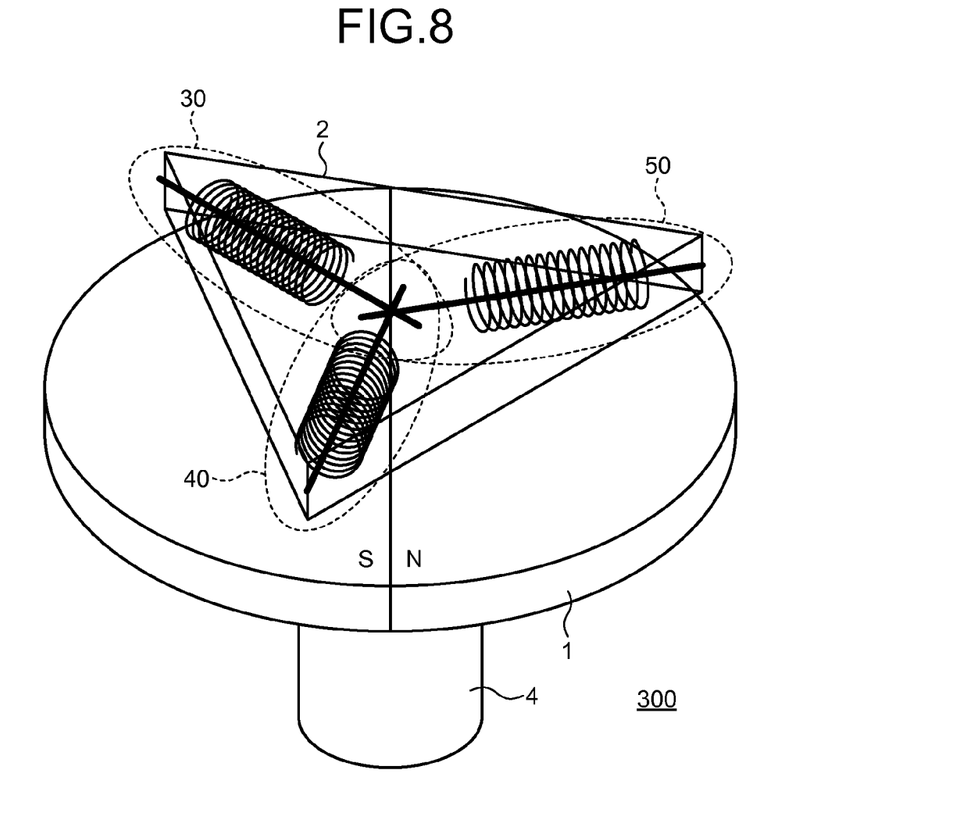
FIG. 8 is a perspective view illustrating a schematic configuration of a rotation number detector according to a third embodiment of the present invention.
Figure 9:
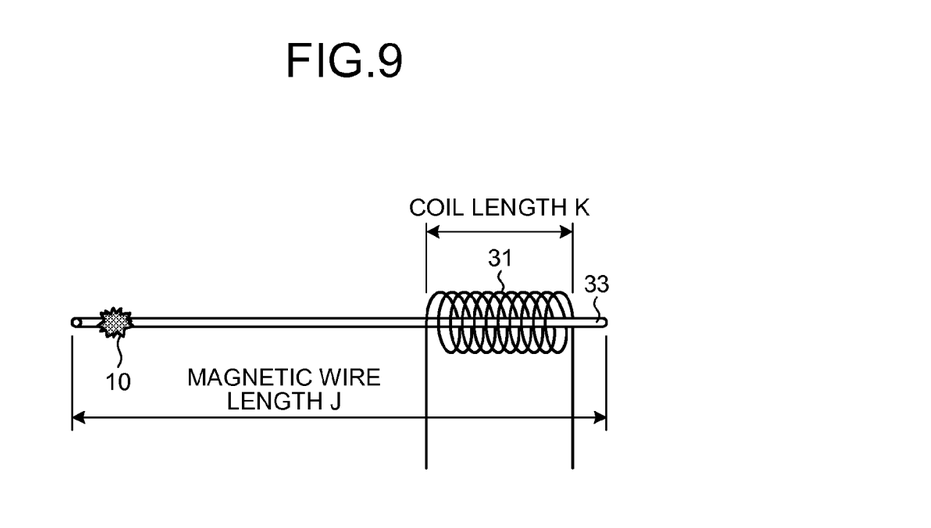
FIG. 9 is a diagram describing a magnetic-reversal generating point of the rotation number detector according to the third embodiment.

FIG. 8 is a perspective view illustrating a schematic configuration of the rotation number detector 300 according to the third embodiment. While the configuration of the rotation number detector 300 is basically identical to that of the rotation number detector 200 according to the second embodiment, the detailed configuration of the power generation unit 2 is different therefrom. The power generation unit 2 is formed as a single package of the power generation elements 30, 40, and 50 and is set at a position away from the magnet 1 by the gap G in the direction of the rotation axis. The power generation elements 30, 40, and 50 are placed with an equal distance therebetween and thus have a phase difference of 120 degrees with respect to one rotation of the magnet 1. As illustrated in FIG. 9, the power generation element 30 is constituted by the pickup coil 31 and the magnetic wire 33. The power generation elements 40 and 50 have an identical configuration to that of the power generation element 30. The pickup coil 31 is set above the vicinity of the middle point between the center of rotation of the magnet 1 and the outer edge thereof. The magnetic wire length J of the magnetic wire 33 in the extension direction is larger than the coil length K and, as illustrated in FIG. 8, only the three magnetic wire portions overlap with one another above the center of rotation of the magnet 1.

Depending upon the materials or manufacturing method of the magnetic wire, the power generation pulse may be more efficiently retrieved by setting the magnetic-reversal generating point 10 at the end of the magnetic wire 33, as illustrated in FIG. 9. In this case, a larger power generation pulse can be acquired by overlapping the ends of the three magnetic wires in the center of rotation of the magnet 1, as illustrated in FIG. 8.

Fourth Embodiment

A configuration of a rotation number detector 400 according to a fourth embodiment of the present invention is described below with reference to FIGS. 10 and 11.

Figure 10:
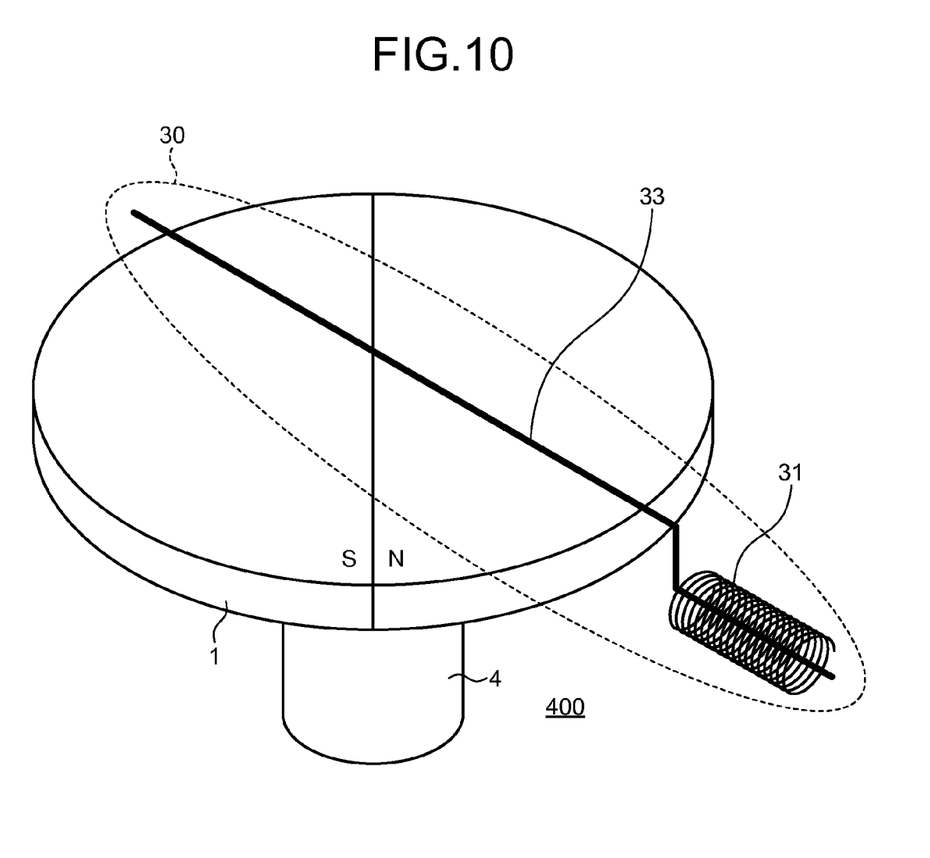
FIG. 10 is a perspective view illustrating a schematic configuration of a rotation number detector according to a fourth embodiment of the present invention.
Figure 11:
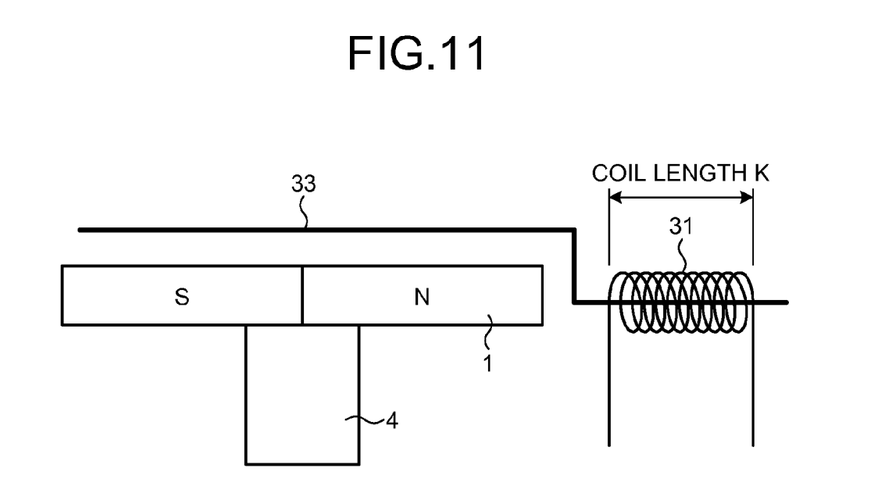
FIG. 11 is a side view illustrating a schematic configuration of the rotation number detector according to the fourth embodiment.

FIG. 10 is a perspective view illustrating a schematic configuration of the rotation number detector 400 according to the fourth embodiment. FIG. 11 is a side view thereof. While the configuration of the rotation number detector 400 is basically identical to that of the rotation number detector 300 according to the third embodiment, a detailed configuration of the power generation unit 2 is different therefrom. The power generation unit 2 is constituted only by the power generation element 30. The power generation element 30 is constituted by the pickup coil 31 and the magnetic wire 33. As illustrated in FIG. 11, the pickup coil 31 is set nearly at the same height as the magnet 1 on the outside of the magnet 1, the whole length of the magnetic wire is larger than the coil length K, and only the magnetic wire portion passes over the center of rotation of the magnet 1. In the magnetic wire 33, because magnetization reversal starts from a certain part and spreads over the entire wire due to the large Barkhausen effect, the pickup coil 31 does not always need to be the same length as the magnetic wire 33. That is, as long as the required power can be retrieved, the detector can be thinned further by a thickness that is the same thickness as that of the coil by providing the pickup coil 31 only at the end of the magnetic wire 33 as in the power generation element 30 according to the present embodiment. The magnetic wire 33 is folded on the outside of the magnet 1. However, the magnetic wire 33 does not always need to be folded, and the shape thereof can be set to conform to the design of the rotation number detector 400. Accordingly, for example, the power generation element can be easily placed in a vacant space, and thus the design flexibility can be improved.

It is common knowledge with regard to conventional power generation elements that "the length of the magnetic wire"="the length of the pickup coil". However in the embodiments of the present invention, as described above, "the length of the pickup coil" is set to be smaller than "the length of the magnetic wire". The pickup coil can be placed at the end of the wire so long as the magnetic wire is set above the center of rotation of the magnet, i.e., at a position that generates the largest amount of power and that strongly resists eccentricity. Accordingly, the power generation element can be easily placed in a vacant space as described above, thereby improving the design flexibility. Further, by crossing (overlapping) the power generation elements of a plurality of power generation elements over (on) one another only at the magnetic wire portions around which the pickup coils are not wound, both thinning of the rotation number detector and improvement of power generation reliability can be achieved.

The invention of the present application is not limited to the above embodiments, and when the present invention is carried out, the invention can be variously modified without departing from the scope thereof. Further, in the above embodiments, inventions of various stages are included, and various inventions can be extracted by appropriately combining a plurality of constituent elements disclosed herein. For example, even when some of the constituent elements are omitted from all the constituent elements described in the above embodiments, in so far as the problems mentioned in the section of Solution to Problem can be solved and effects described in the section of Advantageous Effects of Invention are obtained, the configuration from which these constituent elements have been omitted can be still extracted as the invention. In addition, constituent elements described in different embodiments can be combined as appropriate.

INDUSTRIAL APPLICABILITY

As described above, the rotation number detector according to the present invention is useful as a rotation number detector that uses a magnetic wire and that counts the number of rotations of a rotating body to be used in various fields, such industrial FA devices and in vehicles, and it is particularly suitable as a highly-reliable rotation number detector that is thin and that can acquire more stable power generation pulses.

REFERENCE SIGNS LIST

1 magnet, 2 power generation unit, 4 rotation shaft, 10 magnetic-reversal generating point, 30, 40, 50 power generation element, 31, 32 pickup coil, 33 magnetic wire, 100, 200, 300, 400 rotation number detector.

The invention claimed is:

1. A rotation number detector that detects a number of rotations of a magnet attached to a rotating body by using a power generation unit, wherein
   the power generation unit includes N power generation elements, each including a magnetic wire, in which magnetization reversal occurs due to a large Barkhausen effect, and a pickup coil that is wound around the magnetic wire, N being a natural number equal to or larger than 1,
   the magnetic wire provided in each of the power generation elements is longer than a wound portion of the pickup coil in an extension direction of the magnetic wire,
   the pickup coil provided in each of the power generation elements has two wound portions
     that are separated from each other by a distance larger than an outer diameter of the pickup coil and
     that are connected in series to each other, and
   the magnetic wire provided in each of the power generation elements is provided above a rotation center of the magnet.

2. The rotation number detector according to claim 1, wherein
   N is a natural number equal to or larger than 2, and
   portions of each of the magnetic wires about which the pickup coils of the N power generation elements are not wound overlap with each other above the rotation center.

3. The rotation number detector according to claim 1, wherein
   the distance between the two wound portions provided in each of the power generation elements is set such that a time difference between times at which the two wound portions respectively detect the magnetization reversal becomes a desired value, and is set based on magnetization reversal velocity and magnetic-reversal generating points of each of the magnetic wires provided in each of the power generation elements.

4. The rotation number detector according to claim 1, wherein the magnet has a disc shape and is radially magnetized with one S pole and one N pole or double-sided four-pole magnetized with two S poles and two N poles, each set of poles on each side.

5. A rotation number detector that detects a number of rotations of a magnet attached to a rotating body by using a power generation unit, wherein
   the power generation unit includes N power generation elements, each including a magnetic wire, in which magnetization reversal occurs due to a large Barkhausen effect, and a pickup coil that is wound around the magnetic wire, N being a natural number equal to or larger than 2,
   the magnetic wire provided in each of the power generation elements is longer than a wound portion of the pickup coil in an extension direction of the magnetic wire,
   the pickup coil provided in each of the power generation elements has two wound portions
     that are separated from each other by a distance larger than an outer diameter of the pickup coil and
     that are connected in series to each other, and
   portions of each of the magnetic wires about which the pickup coils of the N power generation elements are not wound overlap with each other.

6. The rotation number detector according to claim 5, wherein
the distance between the two wound portions provided in each of the power generation elements is set such that a time difference between times at which the two wound portions respectively detect the magnetization reversal becomes a desired value, and is set based on magnetization reversal velocity and magnetic-reversal generating points of each of the magnetic wires provided in each of the power generation elements.

7. The rotation number detector according to claim 5, wherein
the magnet has a disc shape and is radially magnetized with one S pole and one N pole or double-sided four-pole magnetized with two S poles and two N poles, each set of poles on each side.

* * * * *